(12) United States Patent
Takayama (10) Patent No.: US 7,782,472 B2
(45) Date of Patent: Aug. 24, 2010

(54) IMAGE FORMING SYSTEM AND IMAGE FORMING METHOD

(75) Inventor: Hideaki Takayama, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1232 days.

(21) Appl. No.: 11/316,912

(22) Filed: Dec. 27, 2005

(65) Prior Publication Data

US 2007/0019219 A1 Jan. 25, 2007

(30) Foreign Application Priority Data

Jul. 21, 2005 (JP) .............................. 2005-211294

(51) Int. Cl.
*G06F 15/02* (2006.01)
(52) U.S. Cl. .................... 358/1.11; 358/1.12; 358/1.15; 358/1.16
(58) Field of Classification Search ............... 358/1.11, 358/1.12, 1.15, 1.16
See application file for complete search history.

(56) References Cited

U.S. PATENT DOCUMENTS

| 5,825,987 | A | * | 10/1998 | Asada | 358/1.11 |
| 6,348,971 | B2 | * | 2/2002 | Owa et al. | 358/1.15 |
| 2002/0051197 | A1 | * | 5/2002 | Minegishi | 358/1.15 |
| 2002/0191199 | A1 | * | 12/2002 | Imada et al. | 358/1.1 |
| 2003/0002056 | A1 | * | 1/2003 | Yamaguchi et al. | 358/1.2 |

FOREIGN PATENT DOCUMENTS

| EP | 0 893 753 B1 | 7/2006 |
| JP | A 04-127361 | 4/1992 |
| JP | A 04-362772 | 12/1992 |
| JP | A 07-152521 | 6/1995 |
| JP | A 07-312664 | 11/1995 |
| JP | A 08-328783 | 12/1996 |
| JP | A 09-091104 | 4/1997 |
| JP | A 10-190899 | 7/1998 |
| JP | A 11-015608 | 1/1999 |
| JP | A 11-041403 | 2/1999 |
| JP | A 11-045161 | 2/1999 |
| JP | A 11-191052 | 7/1999 |

(Continued)

OTHER PUBLICATIONS

Mar. 16, 2010 Office Action issued in Japanese patent application No. 2005-211294 (with translation).

(Continued)

*Primary Examiner*—Chan S Park
(74) *Attorney, Agent, or Firm*—Oliff & Berridge, PLC (57) ABSTRACT

An image forming system including an image reading apparatus and a printing apparatus connected to the image reading apparatus through a communication line, in which the image reading apparatus includes a font information acquiring unit which acquires font information indicating a type of a font installed on the printing apparatus, a print data generating unit which generates desired print data by using the font information acquired from the font information acquiring unit, and a print data transmitting unit which transmits the print data generated by the print data generating unit to the printing apparatus, and in which the printing apparatus prints out the desired print data on the basis of the print data transmitted from the print data transmitting unit.

3 Claims, 7 Drawing Sheets

FOREIGN PATENT DOCUMENTS

| | | |
|---|---|---|
| JP | B2 2971547 | 8/1999 |
| JP | B2 3051496 | 3/2000 |
| JP | A 2000-215016 | 8/2000 |
| JP | A 2000-293152 | 10/2000 |
| JP | A 2001-117739 | 4/2001 |
| JP | B2 3257588 | 12/2001 |
| JP | A 2002-044299 | 2/2002 |
| JP | A 2002-127559 | 5/2002 |
| JP | A 2002-312208 | 10/2002 |
| JP | A 2003-015827 | 1/2003 |
| JP | B2 3495900 | 11/2003 |
| JP | B2 3552812 | 5/2004 |
| JP | B2 3624018 | 12/2004 |
| JP | A 2005-110085 | 4/2005 |

OTHER PUBLICATIONS

Jun. 1, 2010 Office Action issued in Japanese patent application No. 2005-211294 (with translation).

* cited by examiner

```
START JOB()
START PAGE()
SET FONT( "Arial" )
PUT TEXT( "SCANNER SETTINGS" )

...

END PAGE()
END JOB()
```

```
START JOB()
START PAGE()
SET CURSOR(100 , 200)
PUT BMP(01a0fe001001a0fe00a009a···)

...

END PAGE()
END JOB()
```

IMAGE FORMING SYSTEM AND IMAGE FORMING METHOD

BACKGROUND OF THE INVENTION

1. Field of the Invention

The present invention relates to an image forming system configured by an image reading apparatus and a printing apparatus as well as an image forming method using the image forming system, and more particularly to an image forming system which makes it possible to produce a print output of information in the image reading apparatus which does not hold font information as well as an image forming method using the image forming system.

2. Description of the Related Art

In an image reading apparatus represented by a scanner, processing is performed for forming image data by effecting the reading of a document, so that font data for generating character data are generally not installed. In contrast, in a printing apparatus such as a printer, a plurality of font data are installed to output character strings contained in image data in a font designated by a PDL (page description language) when the printer prints out image data described in a corresponding PDL.

Various types of font data are held in the printer so that character strings of image data whose print request has been made can be printed out accurately. By using these font data, the printer is able to produce list outputs of printer information set in the printer and network information of the printer, and a report output of such as a job history in the printer.

Various information concerning the scanner cannot be printed out since the scanner does not hold font information. In a case where the various information is to be confirmed, the confirmation is normally made by causing a display device of the scanner to display to that effect.

A technique disclosed in Japanese Patent Application Laid-Open No. 2001-117739 is known as a conventional technique in which, in a case where an arbitrary printer is to be used among a plurality of printers in a network environment in which the plurality of printers are connected through a network, a screen font corresponding to a printer font is retrieved from a font file stored in advance in a server. If the screen font is not available, font metrix information is acquired from the printer, or font metrix information is generated within the server, and the metrix information is sent to a client PC, so as to make effective use of the printer fonts.

However, with the conventional technique disclosed in the Japanese Patent Application Laid-Open No. 2001-117739, although printer fonts can be effectively used in the environment in which various information processing apparatuses are connected, it is necessary to newly provide a server for managing the fonts, and there is a problem in that the cost involved in its use increases.

SUMMARY OF THE INVENTION

Accordingly, it is an object of the present invention to provide an image forming system and an image forming method which allows a printing apparatus to print out information on an image reading apparatus on which font information is not installed.

To attain the above object, in accordance with an aspect of the present invention there is provided an image forming system which includes an image reading apparatus and a printing apparatus connected to the image reading apparatus through a communication line, in which the image reading apparatus includes a font information acquiring unit which acquires font information indicating a type of a font installed on the printing apparatus, a print data generating unit which generates desired print data by using the font information acquired from the font information acquiring unit, and a print data transmitting unit which transmits the print data generated by the print data generating unit to the printing apparatus, and in which the printing apparatus prints out the desired print data on the basis of the print data transmitted from the print data transmitting unit.

BRIEF DESCRIPTION OF THE DRAWINGS

Embodiments of the present invention will be described in detail based on the following figures, wherein.

DETAILED DESCRIPTION OF THE INVENTION

Hereafter, an embodiment of the image forming system and the image forming method according to the invention will be described in detail by referring to the accompanying drawings.

In the embodiment below, a description will be given by illustrating a scanner as an example of an image reading apparatus and illustrating a printer as an example of a printing apparatus.

Figure 1:
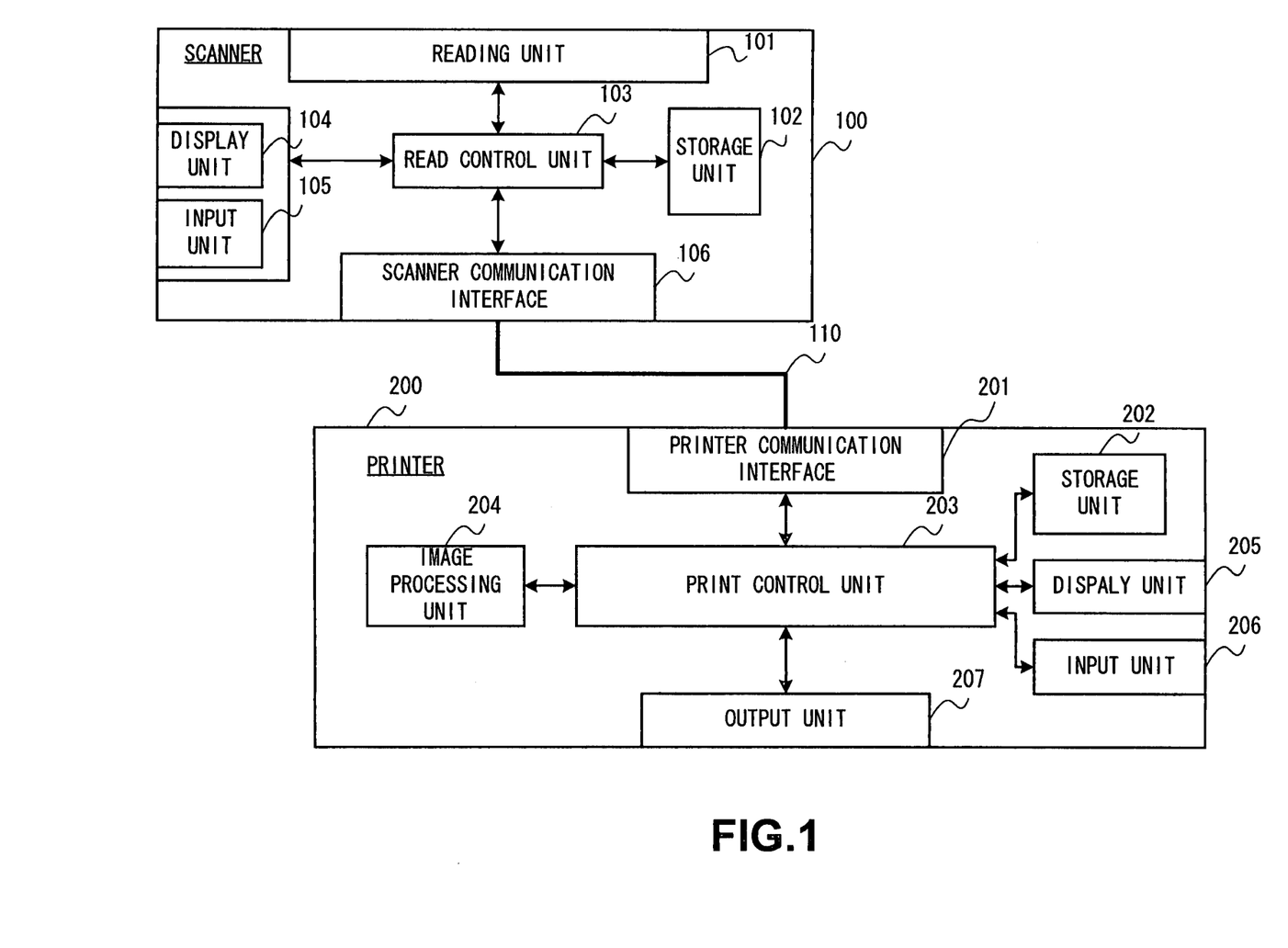
FIG. 1 is a system diagram of an image forming system configured by applying thereto the image forming system and the image forming method in accordance with the invention.

FIG. 1 is a system diagram of an image forming system configured by applying thereto the image forming system and the image forming method in accordance with the invention.

In FIG. 1, this image forming system is so configured that a scanner 100 and a printer 200 are connected by a communication line 110. The communication line 110 is realized by a network line such as a LAN (local area network) cable or a local line such as a USB (Universal Serial Bus) cable or an IEEE (Institute of Electrical and Electronic Engineers) 1284 cable. The scanner 100 and the printer 200 are capable of mutual communication through the communication line 110.

First, the scanner 100 is configured by including a reading unit 101, a storage unit 102, a read control unit 103, a display unit 104, an input unit 105, and a scanner communication interface 106.

The reading unit 101 is constituted by a CCD (charge coupled device), and reads a document placed on an ADF (automatic document feeder) or a FB (flatbed) to generate image data. The generated image data are transferred to the read control unit 103.

The storage unit 102 is constituted by a ROM (read only memory) and a RAM (random access memory), and temporarily stores programs and various setting information for executing the functions of the scanner 100, as well as the image data read by the reading unit 101.

This setting information includes scanner function setting information which is referred to at the time of realizing a function installed on the scanner, as well as information indicating a state such as version information of firmware. The storage unit 102 further stores state information including sending information in which a printing request is made to the connected printer 200, failure information such as the content and the date of a failure which occurred, and information on registered destinations which have been registered as sending destinations. These scanner function setting information and state information will hereafter be collectively referred to as "utility information."

In addition, the programs include a utility print program for realizing a print output of this utility information (hereafter referred to as a "utility print"). As a user selects utility information to be printed out by operating the input unit 105, that utility information is printed out.

Figure 2A:
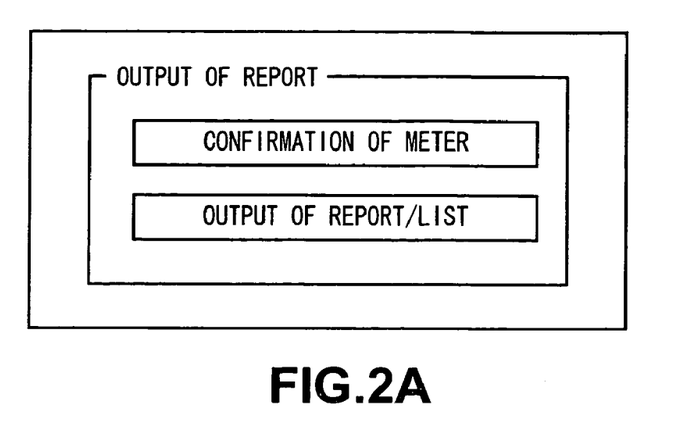
FIGS. 2A to 2C are diagrams illustrating screens for instructing a utility print in the image forming system in accordance with the invention.
Figure 2B:
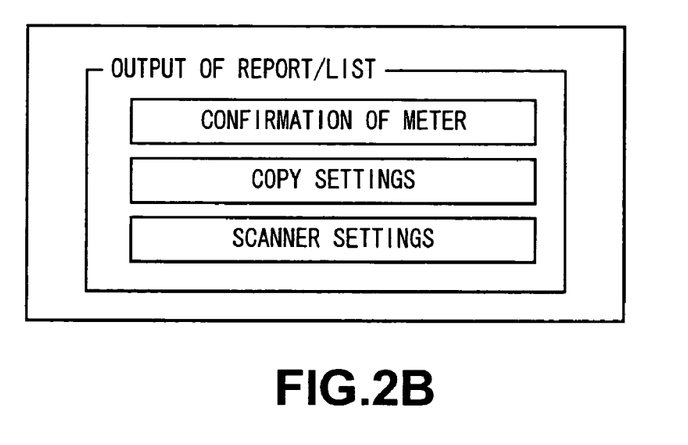
Figure 2C:
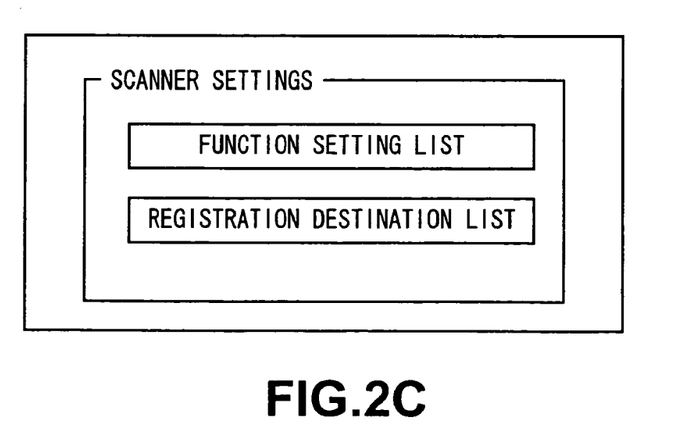

FIGS. 2A to 2C show the transition of the screen until the scanner function setting information, which is this utility information, is printed out as a function setting list.

Further, the storage unit 102 stores in advance a printer to which a request for acquisition of font information is sent to acquire font information.

It should be noted that instead of the configuration in which font information is acquired from a printer which has been stored in advance, it is possible to adopt a configuration in which a program is held for displaying on the screen a list of printers connected to the scanner, and a printer can be selected by executing that program at the time of acquiring the font information.

The read control unit 103 is constituted by such as a CPU (central processing unit) for performing main control of the scanner, and stores in the storage unit 102 the image data read by the reading unit 101.

When a utility print is instructed from the input unit 105, the read control unit 103 creates a request for acquisition of font information installed on the printer, and transfers the font information acquisition request through the scanner communication interface 106 to the printer 200 which has been stored in advance in the storage unit 102. When the read control unit 103 acquired the font information as a response to this font information acquisition request, the read control unit 103 generates desired print data from the information stored in the storage unit 102.

In particular, print data of the PDL (page description language) format are generated by describing the utility information stored in the storage unit 102 in the PDL.

Figure 4:
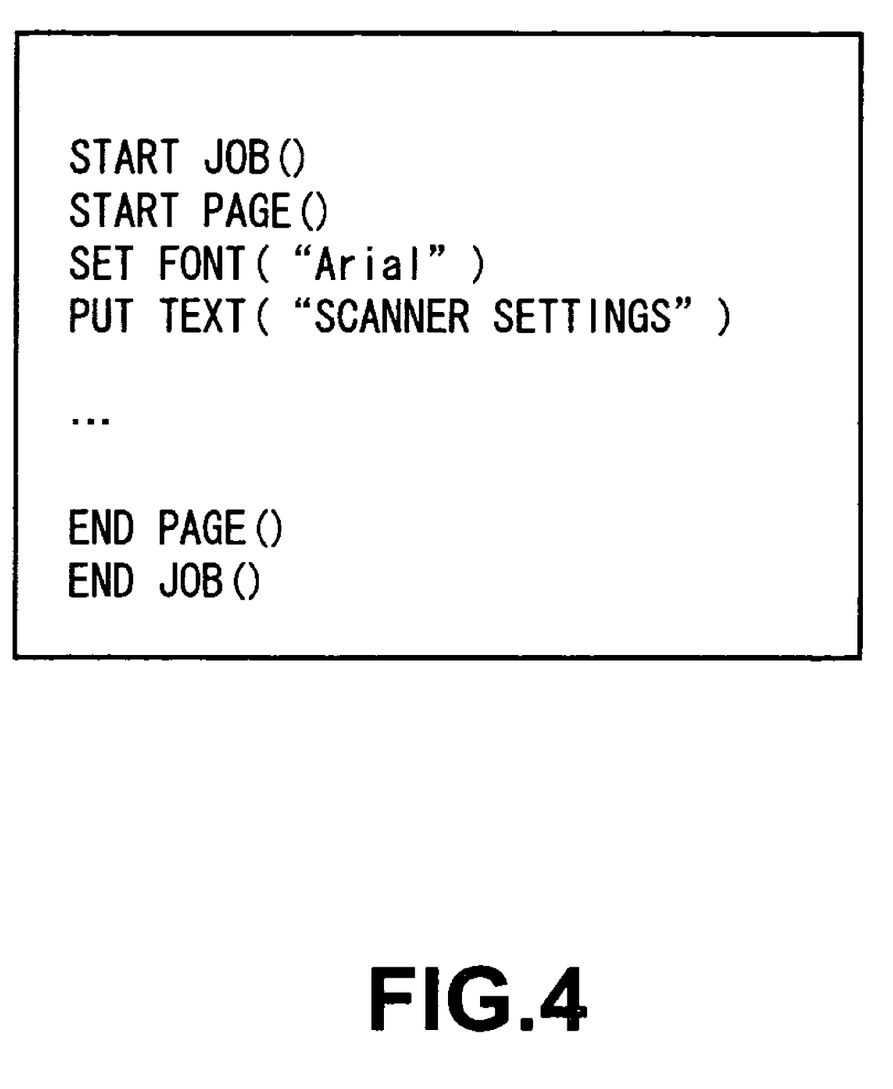
FIG. 4 is diagram illustrating an example of a PDL for producing a utility print by commands in the image forming system in accordance with the invention.
Figure 6:
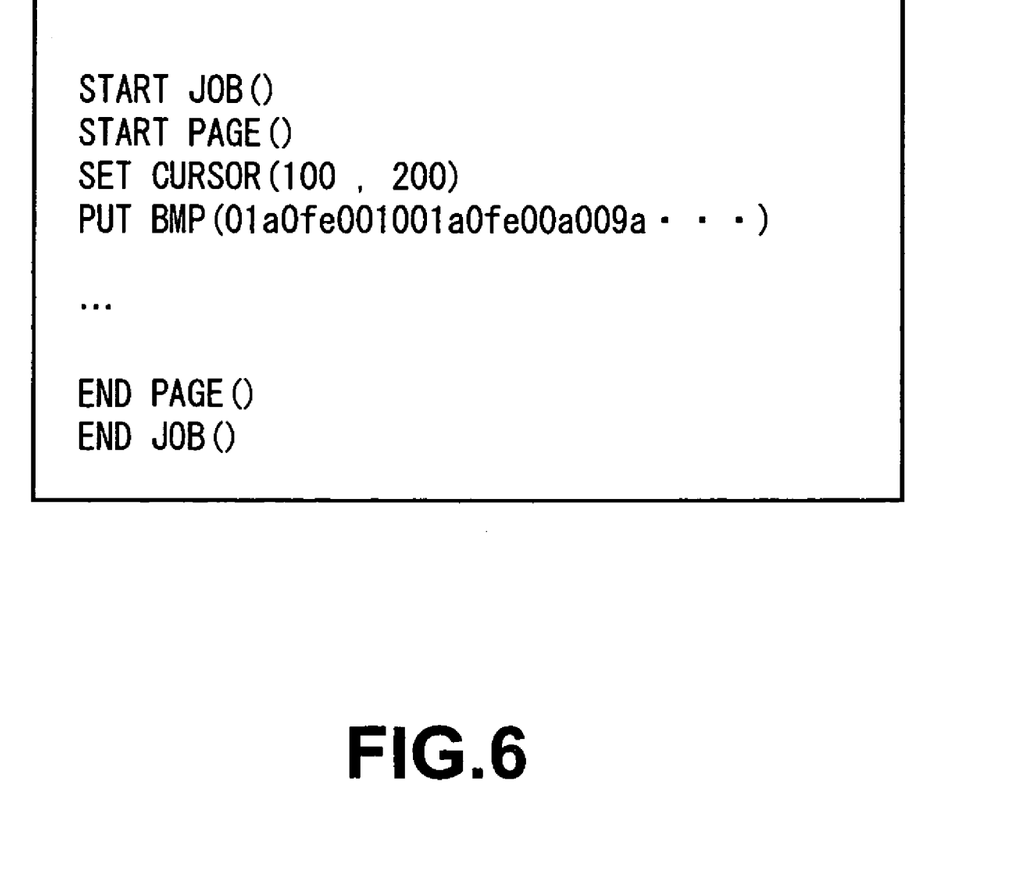
FIG. 6 is diagram illustrating an example of the PDL for producing a utility print by image data.

The print data of the PDL format (hereafter referred to as the "PDL data") are data such as those shown in FIGS. 4 and 6, and these data are those in which a font is selected from the acquired font information, and character strings to be printed are designated to the font. These PDL data are sent to the printer through the scanner communication interface 106.

When, among others, PDL data such as those shown in FIG. 6 are generated, a font of a bit map format is acquired from the printer 200 to which the font information acquisition request has been sent, and an acquisition request in which this font of the bit map format has been designated is transferred to the printer 200, thereby realizing a print output.

Furthermore, the print data may be generated by generating image data on the utility information on the basis of the acquired font information, and by describing the image data in the page description language.

The display unit 104 and the input unit 105 are user interfaces provided in the scanner. As a function confirmation button provided on the input unit 105 is pressed, a report output selection screen such as the one shown in FIG. 2A is displayed on the display unit 104.

The scanner communication interface 106 is a communication interface for realizing communication with the printer 200, and is capable of communication through a cable such as a LAN cable, a USB cable, an IEEE 1284 cable, or the like.

Figure 7:
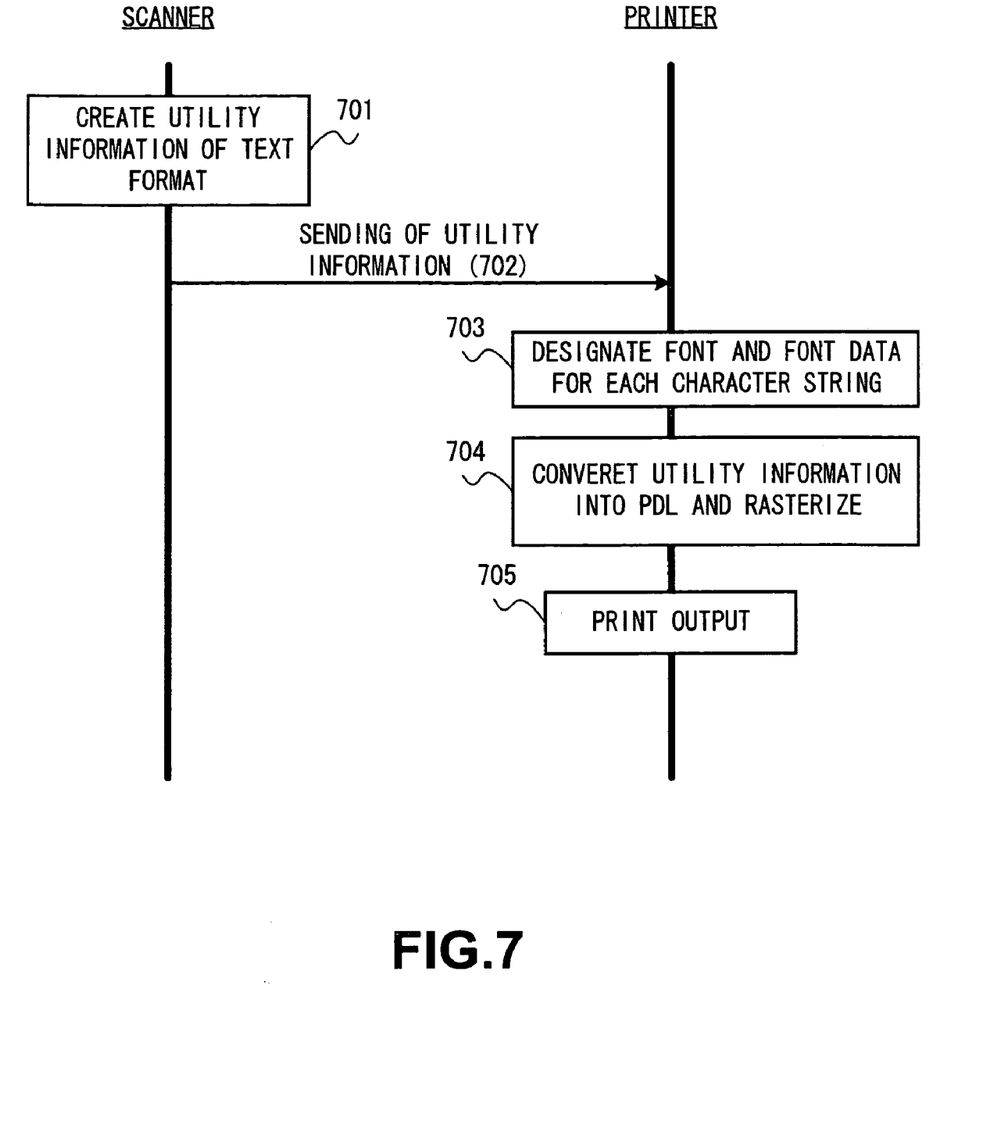
FIG. 7 is a sequence diagram for producing a utility print by using a text in the image forming system in accordance with the invention.

It should be noted that instead of inquiring after the font information from the scanner to the printer at the time of producing a utility print, a configuration may be adopted in which utility information of a text format which is printed out by a printer is prepared, and the utility information is transferred to the printer, to allow the printer to allot a font to the respective information of the utility information and realize a utility print. The sequence at this time is shown in FIG. 7.

In the read control unit 103 described above, the PDL data are generated by describing the utility information in the PDL, but it is also possible to prepare utility information of the text format and send this utility information of the text format to the printer 200 through the scanner communication interface 106.

In this case, the printer 200 determines attributes which the respective information of the utility information has, and generates the print data in which the font stored in the storage unit 102 is allotted in accordance with the contents shown by the attributes. Further, in this utility information, it is possible to designate metadata indicating the contents shown by the respective information. An example of utility information in which the metadata are designated is shown below.

Next, the printer 200 is configured by including a printer communication interface 201, a storage unit 202, a print control unit 203, an image processing unit 204, a display unit 205, an input unit 206, and an output unit 207.

The scanner communication interface 201 is a communication interface for realizing communication with the scanner 100, and is capable of communication through a cable such as a LAN cable, a USB cable, an IEEE 1284 cable, or the like.

The storage unit 202 is constituted by a ROM and a RAM, and stores programs and various setting information for realizing the printer function. Also, the storage unit 202 stores fonts which are used at the time of printing character strings contained in the image data for which a print request has been made. The storage unit 202 stores a plurality of fonts and holds a list of font information to show what fonts are included among the stored fonts (hereafter referred to as the "font data").

For example, "Courier," "Gothic," "Arial," and "Century" are included among the fonts which are installed on the printer.

The print control unit 203 is constituted by a CPU which performs the overall print control of the printer, and produces a print output of the image data received through the printer communication interface 201.

At this time, when the print control unit 203 receives a request for acquisition of font information through the printer communication interface 201, the print control unit 203 acquires font information stored in the storage unit 202, and transfers it to the scanner 100 which made the request.

In addition, upon receiving a request to print the PDL data containing character strings for which a font has been designated, the print control unit 203 acquires the designated font from the storage unit 202 and instructs image processing of the PDL data to the image processing unit 204. In the image processing by the image processing unit 204, image data of the bit map format are generated with respect to the PDL data, and these image data are transferred to the output unit 207.

Further, when a request to print the PDL data for which a font, character strings, and a font size have been designated is transferred from the scanner 100 through the printer communication interface 201, an image processing request is made to the image processing unit 204, and the PDL data having the character strings subjected to image processing with designated font and font size are printed out.

The image processing unit 204 analyzes the received PDL data, and performs image processing including rasterization processing for converting the PDL data into a bit map format in which the data are expressed as a set of dots arranged in a lattice form, to thereby generate image data of the bit map format.

Furthermore, upon receiving a request to generate font data from the print control unit 203, the image processing unit 204 rasterizes the designated character strings with the designated font and font size and generates font data of the bit map format.

The display unit 205 and the input unit 206 are user interfaces for instructing the printer, and are able to instruct various settings concerning the print output, stopping or re-execution of the print output, and the like.

The output unit 207 receives a print output request from the print control unit 203 and prints image data of the bit map format on printing paper. Namely, the output unit 207 outputs a report or a list in the utility information of the scanner.

By virtue of the above-described configuration, it becomes possible to print out the utility information of the scanner by using a font stored in the storage unit of the printer.

FIGS. 2A to 2C are diagrams illustrating screens for instructing a utility print in the image forming system in accordance with the invention.

FIG. 2A is a diagram illustrating a report output selecting screen for selecting the contents to be confirmed. FIG. 2B is a diagram illustrating a report function selecting screen for selecting a function for outputting a report. FIG. 2C is a diagram illustrating a report details selecting screen for selecting the contents of a report in the selected function.

In FIG. 2A, "CONFIRMATION OF METER" and "OUTPUT OF REPORT/LIST" can be selected as the contents to be confirmed. If "CONFIRMATION OF METER" is selected, it is possible to confirm a meter set in the printer. If "OUTPUT OF REPORT/LIST" is selected, a list of functions which can be outputted as a report/list is displayed, as shown in FIG. 2B.

In FIG. 2B, "CONFIRMATION OF JOB," "COPY SETTINGS," and "SCANNER SETTINGS" can be selected as items to be outputted as a report or displayed as a list. If "CONFIRMATION OF JOB" is selected, it is possible to confirm a list of jobs for which requests for print output were made in the past. Meanwhile, if "COPY SETTINGS" is selected, it is possible to confirm various setting information in the copy function. If "SCANNER SETTINGS" is selected, it is possible to confirm utility information set in the scanner.

FIG. 2C shows a screen which is displayed when "SCANNER SETTINGS" is selected in FIG. 2B, and illustrates that a "FUNCTION SETTING LIST" and a "REGISTRATION DESTINATION LIST" can be outputted as details of the scanner settings.

In the function setting list, it is possible to output utility information set in the scanner. In the registration destination list, registered information is outputted as destinations to which the data can be sent from the scanner. For instance, a list of email addresses and facsimile numbers can be outputted.

By selecting "FUNCTION SETTING LIST," a utility print for outputting utility information is executed.

A description will be given below of the sequence of processing which is executed by selecting "REGISTRATION DESTINATION LIST."

Figure 3:
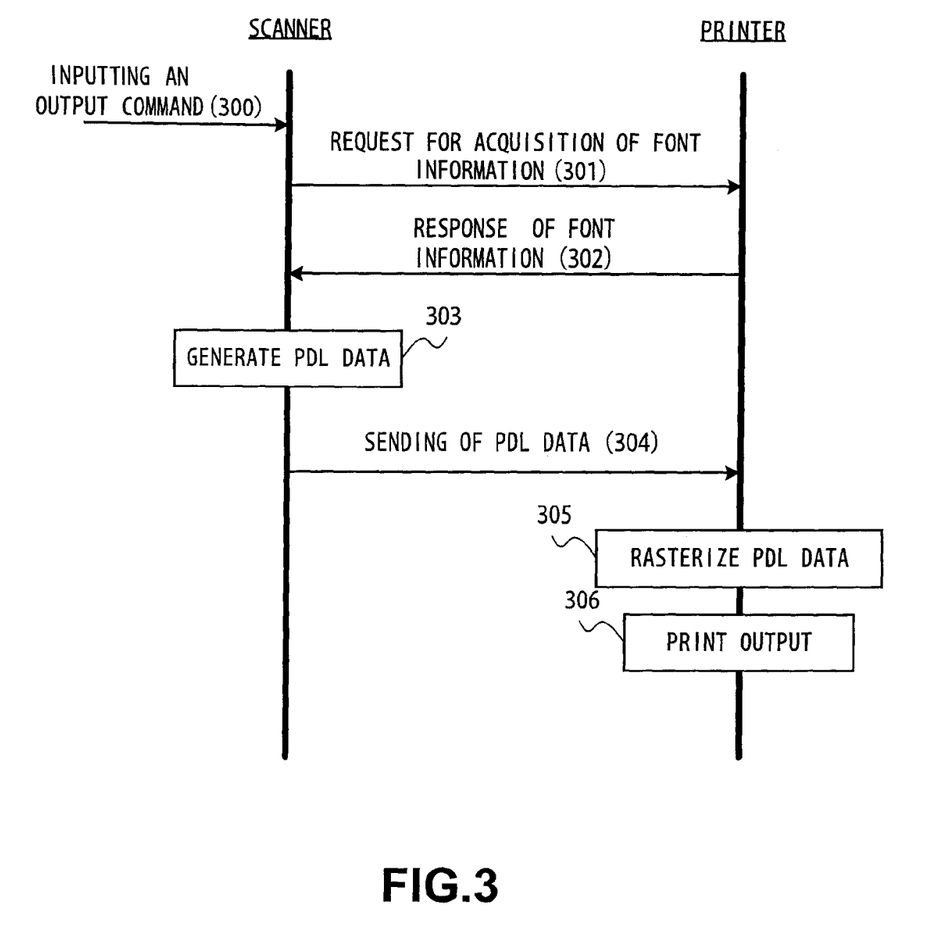
FIG. 3 is a sequence diagram for producing a utility print by commands in the image forming system in accordance with the invention.

FIG. 3 is a sequence diagram for producing a utility print by commands in the image forming system in accordance with the invention.

FIG. 3 shows an example in which a utility print for printing out utility information of the scanner is realized in a state in which the scanner and the printer are connected through a local line or a network line.

First, if the user instructs an output of a function setting list (utility print) (300) by using the screens of the scanner, such as those shown in FIGS. 2A to 2C, the scanner requests to the printer information on the fonts installed on the printer (301). The font information at this time is information which indicates types of fonts installed on the printer, and it is a list of installed fonts such as "Arial," "Century," and "Courier."

In addition, the printer to which the request for the font information is made may be a printer designated in advance, or may be a printer selected by the user when a list of printers is displayed.

Subsequently, upon receiving the request for font information from the scanner, the printer sends information on the installed fonts to the scanner which made the request (302). Upon acquiring the font information, the scanner generates data for producing a utility print on the basis of the font information sent thereto (303).

The data for producing the utility print at this time are PDL data which have been generated by designating a font contained in the received font information to the character strings to be printed. An example of the PDL data at this time is shown in FIG. 4.

The PDL data for producing the utility print shown in FIG. 4 are print data which have been described in the page description language, and are data in which the font of the character strings to be printed has been designated by a SET FONT command, following a command for producing a utility print (START JOB, STAGE PAGE).

The font designated by this SET FONT command is "Arial," and character strings to be printed by using this font are designated by a PUT TEXT command. Namely, the character strings "SCANNER SETTINGS" are printed by the font "Arial."

PDL data in which the font has thus been designated for the character strings to be printed are generated.

Then, the PDL data such as those shown in FIG. 4 are sent to the printer (304), and the printer which received the PDL data rasterizes the PDL data to generate image data of the bit map format (305), and produces a print output (306).

As a result, it is possible to print out the utility information of the scanner.

Figure 5:
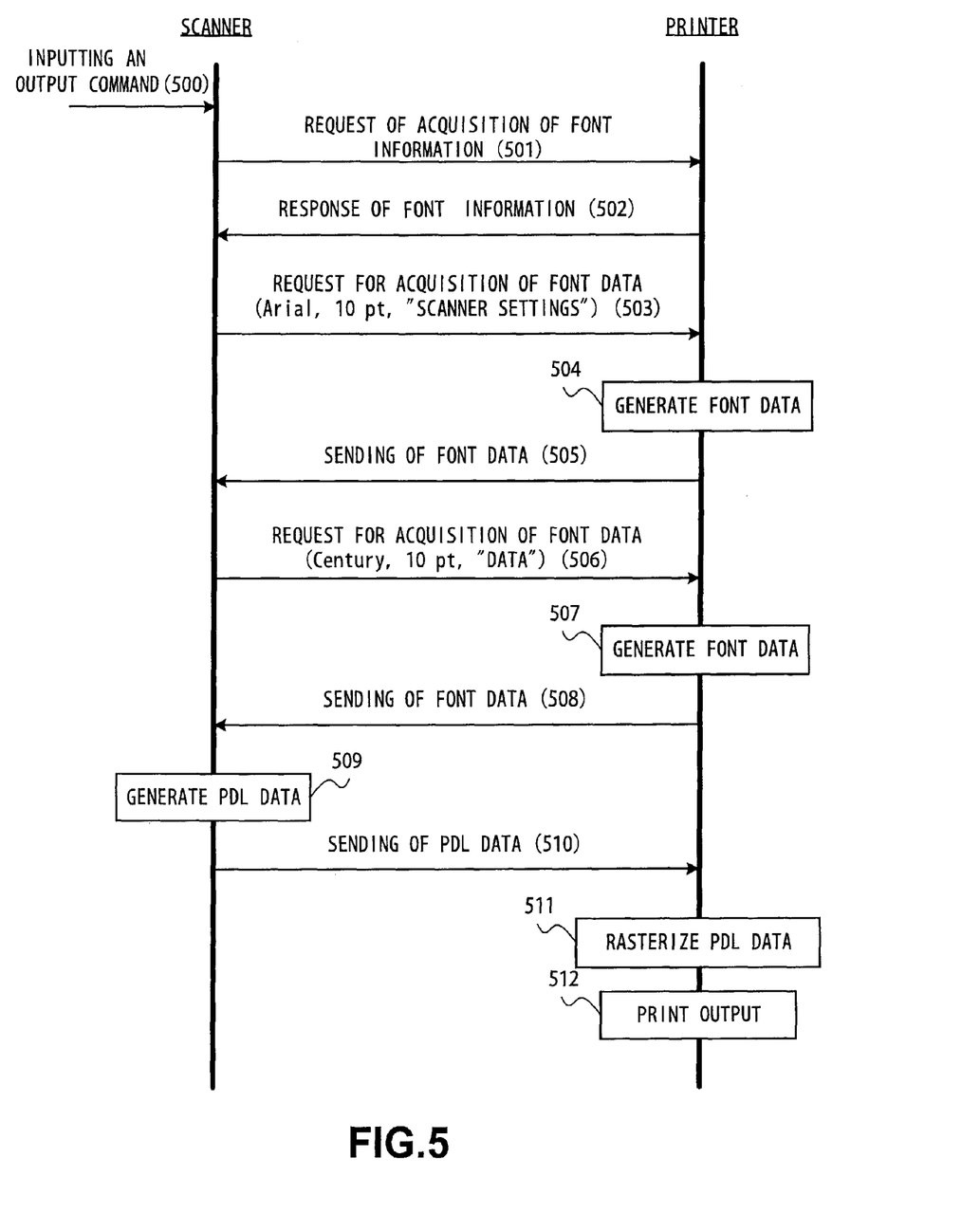
FIG. 5 is a sequence diagram for producing a utility print by using image data in the image forming system in accordance with the invention.

FIG. 5 is a sequence diagram for producing a utility print by using image data in the image forming system in accordance with the invention.

In FIG. 5, in the same way as the sequence shown in FIG. 3, if the user instructs an output of a function setting list (utility print) (500) by using the screens of the scanner, such as those shown in FIGS. 2A to 2C, the scanner requests to the printer information on the fonts installed on the printer (501). Upon receiving the request for font information, the printer sends information on the installed fonts to the scanner which made the request (502).

In the sequence shown in FIG. 3, the PDL data are generated in which the scanner, upon acquiring the information on the fonts installed on the printer, has designated a font to the character strings to be printed. In this sequence, however, a font to be used is selected for each character string to be printed on the basis of the acquired font information, and processing is carried out by the printer.

The scanner, upon acquiring the information on the fonts installed on the printer, designates a character string to be printed as well as a font and a font size, and sends a request for acquisition of font data to the printer from which the font information was acquired (503).

The printer, upon receiving the request for acquisition of font data, rasterizes the designated character strings according to the designated front and font size, to thereby generate font data converted to bit map data (504), and send the generated font data of the bit map format to the scanner which made the request (505).

For example, in a case where a request for acquisition of font data has been made with respect to the character strings "SCANNER SETTINGS" by using the font "Arial" with a font size of "10 pt," the font data rasterized by the printer and received by the scanner are bit-map format data of "01a0fe001001a0fe00a009a0fb00a0a000a001a00100 fecca . . . "

It is possible to acquire font data by repeatedly carrying out the processing (503) for sending a request for acquisition of font data by designating the character strings to be printed as well as their font and font size up to the processing (505) in which the front data are acquired.

FIG. 5 shows that the font data in which the character strings "SCANNER SETTINGS" have been rasterized by the printer by using the font "Arial" and the font data in which the character string "DATA" has been rasterized by the printer by using the font "Century" are received by the scanner (505, 508).

At this time, the font data in a case where a request for acquisition of font data has been made with respect to the character strings "SCANNER SETTINGS" by using the font "Century" with a font size of "10 pt" are bit-map format data of "cca03ca0fd00cca03ca0fd00cca019a0 . . . "

After acquiring the bit-map format data through the above-described processing, the scanner generates PDL data whose print request is made to the printer (509). An example of the PDL data generated at this time is shown in FIG. 6.

In the PDL data for producing the utility print shown in FIG. 6, a SET CURSOR command indicating the printing position of the character string is described, following a command for producing a utility print (START JOB, STAGE PAGE). This SET CURSOR command shows that the character string is printed at X-coordinate 100 and Y-coordinate 200.

FIG. 6 shows that the bit-map format font data of "01a0fe001001a0fe00a009a0fb00a0a000a001a00100 fecca . . . " designated by a PUT BMP command are printed at this position. However, since these are the character strings "SCANNER SETTINGS," "SCANNER SETTINGS" is printed at the X-coordinate 100 and the Y-coordinate 200.

PDL data in which the character strings to be thus printed are generated as a bit-map format image are sent to the printer (510).

Then, the printer generates image data of the bit map format by rasterizing the received PDL data (511), and produces a print output (512)

It should be noted that although a configuration is adopted in which font data of the bit map format are acquired, and PDL data for directly printing the font data are generated, a configuration may be adopted in which instead of generating the PDL data, image data which can be directly subjected to print processing without being rasterized by the printer may be generated.

FIG. 7 is a sequence diagram for producing a utility print by a text in the image forming system in accordance with the invention.

In FIG. 7, the scanner generates utility information of the scanner in a text format, and this utility information of the text format is transferred to the printer, to thereby realize a utility print.

In the same way as the sequence shown in FIG. 3, if the user instructs an output of the function setting list (utility print) by using the screens of the scanner, such as those shown in FIGS. 2A to 2C, the scanner generates its utility information in a text format (701). In this utility information of the text format, each character string is bracketed by quotation marks (" "), and the utility information of the text format is processed for each of these character strings.

An example of the utility information of the text format is shown below.

"SCANNER SETTINGS"

""

"F/W VERSION: Ver1.01"

"IP ADDRESS: 192.168.1.127"

. . .

Such utility information of the text format is sent from the scanner to the printer (702), and the printer which received it designates a font and a font size for each character string (703). The character string is described in the page description language in accordance with the designated font and font size and is converted into a bit map (704), and is printed out (705).

As a result, the utility information of the text format can be produced as a utility print.

It should be noted that in the sequence diagrams shown in FIGS. 3 and 5, the configuration provided is such that the PDL data are sent to the printer after completion of the generation of the PDL data, but a configuration may be adopted such that the PDL data are sent concurrently with the generation of the PDL data.

By virtue of the above-described processing, in the image forming system in accordance with the invention it becomes possible to print out the utility information of the scanner by using the fonts installed on the printer.

In consequence, it becomes possible for the user to confirm the utility information of the scanner through paper, and its state can be ascertained more accurately.

The present invention is not limited to the embodiment described above and illustrated in the drawings, and can be implemented by being modified appropriately within the scope that does not change the gist of the invention.

For example, although in FIG. 7 illustrated in the above-described embodiment utility information of a plain text consisting of only character strings to be outputted is sent to the printer, a utility print may be realized by sending utility information of a format containing the following metadata.

An example of utility information containing metadata is shown below.

<Title>SCANNER SETTINGS</Title>

<Separator>""</Separator>

<Item-Value>F/W VERSION: Ver1.01</Item-Value>
<Item-Value>IP ADDRESS: 192.168.1.127</Item-Value>
...

In this utility information, an example is shown in which metadata are designated for each step (line) by using a tag, and as the printer interprets the tag of each step, utility information is outputted.

For example, the <Title> tag shows the title of utility information, and the <Item-Value> tag shows that it is an item of utility information.

Thus, it is possible to print out the utility information in which metadata is set.

As stated above, a first aspect of the present invention provides an image forming system which includes an image reading apparatus and a printing apparatus connected to the image reading apparatus through a communication line, in which the image reading apparatus includes a font information acquiring unit which acquires font information indicating a type of a font installed on the printing apparatus, a print data generating unit which generates desired print data by using the font information acquired from the font information acquiring unit, and a print data transmitting unit which transmits the print data generated by the print data generating unit to the printing apparatus, and in which the printing apparatus prints out the desired print data on the basis of the print data transmitted from the print data transmitting unit.

A second aspect of the present invention is the image forming system according to the first aspect of the invention, in which the print data generating unit may have a font data acquiring unit which acquires font data of a character converted into a bit map format from the printing apparatus by transferring to the printing apparatus a character to which a font included in the font information acquired from the font information acquiring unit has been designated, and generates the print data by describing in a page description language the font data of the bit map format acquired in the font data acquiring unit.

A third aspect of the present invention is the image forming system according to the second aspect of the invention, in which the print data generating unit may generate image data on the basis of the font data acquired in the font data acquiring unit, and generates the print data concerning the image data.

A fourth aspect of the present invention provides an image forming system which includes an image reading apparatus and a printing apparatus connected to the image reading apparatus through a communication line, in which the image reading apparatus includes an information creating unit which generates information of a text format and an information transmitting unit which transmits to the printing apparatus the information of the text format generated by the information creating unit, and in which the printing apparatus includes an attribute determining unit which determines attributes of various information contained in the information of the text format transmitted from the information transmitting unit, a font allotting unit which allots a font on the basis of the attribute determined by the attribute determining unit, and a print data generating unit which generates print data corresponding to the information of the text format on the basis of the font allotted by the font allotting unit.

A fifth aspect of the present invention is the image forming system according to the fourth aspect of the invention, in which the information creating unit may have a metadata designating unit which designates, for each item of the information of the text format, metadata indicating a content indicated by the respective information contained in the information of the text format.

A sixth aspect of the present invention provides an image forming method in an image forming system which includes an image reading apparatus and a printing apparatus connected to the image reading apparatus through a communication line, the method includes causing the image reading apparatus to acquire in a font information acquiring unit font information indicating a type of a font installed on the printing apparatus; causing the image reading apparatus to generate in a print data generating unit desired print data by using the font information acquired from the font information acquiring unit; causing the image reading apparatus to transmit by a print data transmitting unit the print data generated by the print data generating unit to the printing apparatus; and causing the printing apparatus to print out the desired print data on the basis of the print data transmitted from the print data transmitting unit.

According to the above-mentioned aspects of the present invention, since the configuration provided is such that font data installed on the printing apparatus connected to the image reading apparatus through a communication line are acquired to allow various information in the image reading apparatus to be printed out, an advantage is offered in that various information of the image reading apparatus on which the font data are not installed can be printed out with high quality.

The present invention is applicable to an image forming system configured by an image reading apparatus and a printing apparatus, and is particularly useful for producing a print output of various information on the image reading apparatus on which fonts are not installed.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-211294 filed on Jul. 21, 2005 including specification, claims, drawings and abstract is incorporated herein by reference in its entirety.

What is claimed is:

1. An image forming system comprising an image reading apparatus and a printing apparatus connected to the image reading apparatus through a communication line,
  wherein the image reading apparatus includes:
    a font information acquiring unit which acquires, based on an instruction from a user to output setting information of the image reading apparatus, font information indicating a type of a font installed on the printing apparatus,
    a font data acquiring unit which acquires font data of a character converted into a bit map format from the printing apparatus by transferring to the printing apparatus a character to which a font included in the font information acquired from the font information acquiring unit has been designated,
    a print data generating unit which generates print data of the setting information by describing in a page description language the font data of the bit map format acquired in the font data acquiring unit, and a print data transmitting unit which transmits the print data generated by the print data generating unit to the printing apparatus, and wherein the printing apparatus prints out the setting information of the image reading apparatus based on the print data transmitted from the print data transmitting unit.

2. The image forming system according to claim 1, wherein the print data generating unit generates image data on the basis of the font data acquired in the font data acquiring unit, and generates the print data concerning the image data.

3. An image forming method in an image forming system comprising an image reading apparatus and a printing apparatus connected to the image reading apparatus through a communication line, comprising:

causing the image reading apparatus to acquire, based on an instruction from a user to output setting information of the image reading apparatus, in a font information acquiring unit font information indicating a type of a font installed on the printing apparatus;

causing the image reading apparatus to acquire in a font data acquiring unit font data of a character converted into a bit map format from the printing apparatus by transferring to the printing apparatus a character to which a font included in the font information acquired from the font information acquiring unit has been designated;

causing the image reading apparatus to generate in a print data generating unit print data of the setting information by describing in a page description language the font data of the bit map format acquired in the font data acquiring unit;

causing the image reading apparatus to transmit by a print data transmitting unit the print data generated by the print data generating unit to the printing apparatus; and causing the printing apparatus to print out the setting information of the image reading apparatus based on the print data transmitted from the print data transmitting unit.

* * * * *